Figures 1, 2:
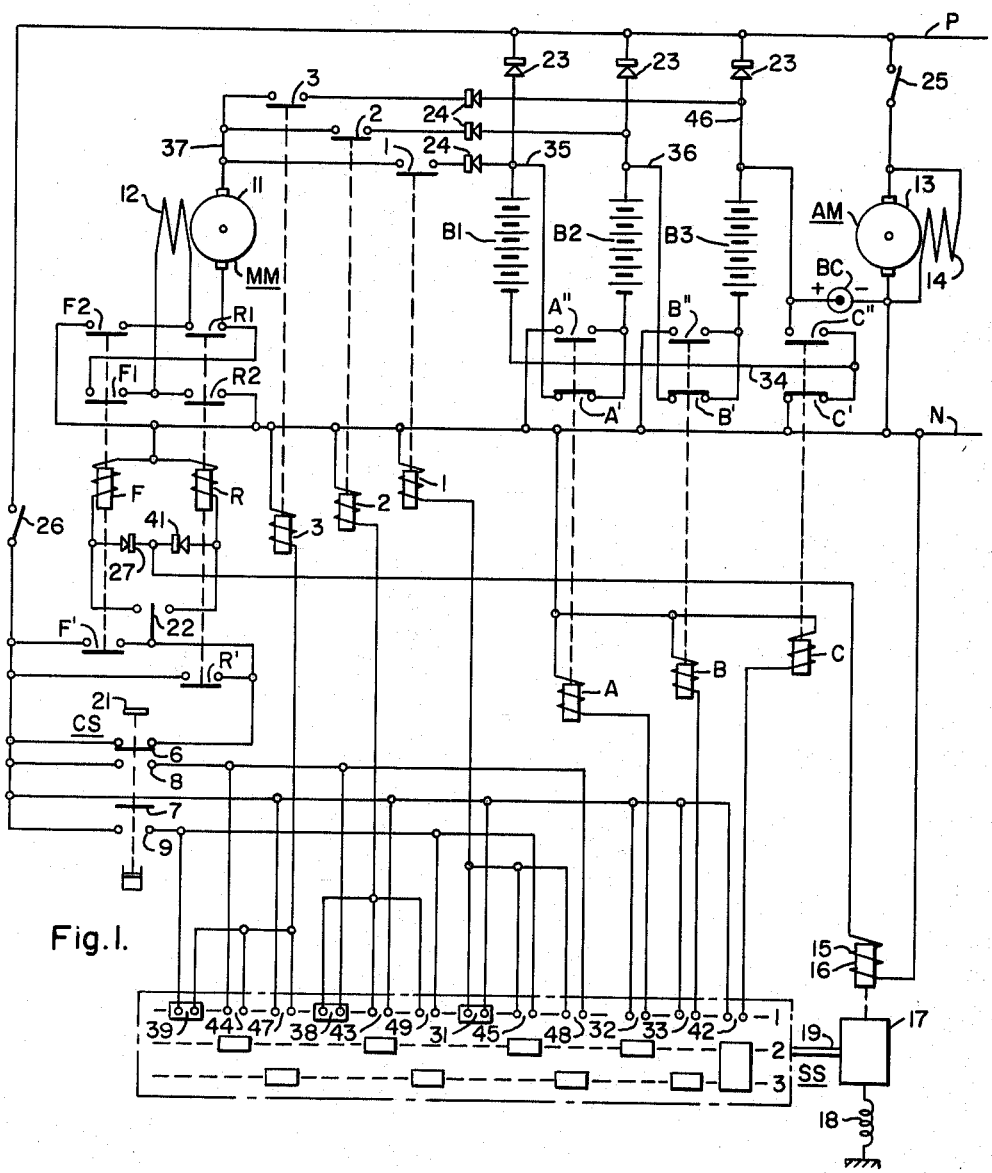

May 3, 1966 J. J. STAMM 3,249,836
MOTOR CONTROL SYSTEM FOR BATTERY-POWERED VEHICLE
Filed Feb. 18, 1963

WITNESSES:
Bernard R. Gregory
James F. Young

INVENTOR
John J. Stamm
BY F. V. Ly
ATTORNEY

United States Patent Office 3,249,836
Patented May 3, 1966

3,249,836
MOTOR CONTROL SYSTEM FOR BATTERY-POWERED VEHICLE
John J. Stamm, Franklin Township, Westmoreland County, Pa., assignor to Westinghouse Electric Corporation, Pittsburgh, Pa., a corporation of Pennsylvania
Filed Feb. 18, 1963, Ser. No. 260,946
4 Claims. (Cl. 318—17)

This invention relates, generally, to control systems and, more particularly, to systems for controlling the operation of battery-powered vehicles.

Heretofore, the acceleration of a battery-powered vehicle, such as an electric truck, has usually been controlled by utilizing accelerating resistors, which are connected in series with the motor and shunted from the motor circuit in successive steps to increase the voltage applied to the driving motor, or by successively connecting the motor to different sections or taps of the battery to increase the applied voltage. When accelerating resistors are utilized considerable power is lost in the resistors. Furthermore, there is a possibility of the resistors becoming overheated and causing a fire. Prior methods of battery tapping have not maintained an equal discharge of the battery sections.

An object of this invention is to provide for connecting a motor to different sections of a battery in successive steps without interrupting the voltage on the motor between steps.

Another object of the invention is to provide for maintaining an equal discharge of the sections of a battery which are connected to a motor or other load in successive steps.

A further object of the invention is to make the full battery voltage available at all times for operating auxiliary apparatus by utilizing the apparatus required for controlling the operation of the main motor.

Still another object of the invention is to provide for charging the battery with all of the sections connected in series-circuit relation.

A more general object of the invention is to provide a motor control system which shall be simple and efficient in operation, and which may be economically manufactured and installed.

In accordance with one embodiment of the invention, the cells of a battery are divided into a plurality of sections or groups each containing the same number of cells. The motor of a truck is accelerated by first connecting one group to the motor and then adding additional groups successively in series-circuit relation with the first until all groups are connected in series to apply maximum voltage to the motor. The groups are rotated each time power is cut off from the motor so that a different group is connected to the motor first each time power is reapplied to the motor, thereby maintaining equal discharge of the groups. Full voltage is made available for auxiliary apparatus by utilizing the switches which interconnect the groups of battery cells to also connect the groups to an auxiliary power bus. These switches are also utilized to connect the groups of battery cells in series-circuit relation for charging the battery. Rectifying diodes are provided to permit closed transition without short-circuiting any of the battery cells.

For a better understanding of the nature and objects of the invention, reference may be had to the following detailed description, taken in conjunction with the accompanying drawing, in which:

FIGURE 1 is a diagrammatic view of a control system embodying the principal features of the invention; and FIG. 2 is a chart showing the sequence of operation of certain switches utilized in the system of FIG. 1.

Referring to the drawing, and particularly to FIG. 1, the system shown therein comprises a main motor MM, an auxiliary motor AM, a battery which is divided into three sections or groups B1, B2 and B3, reversing switches F and R, a plurality of switches or electromagnetic contactors A, B and C for interconnecting the groups of battery cells, additional switches 1, 2 and 3 for sequentially connecting the battery groups to the main motor to increase the voltage on the motor in successive steps, a stepping switch or drum SS for controlling the operation of the switches A, B and C, and a control switch CS which cooperates with the switch SS to control the operation of the switches 1, 2 and 3 and to rotate the sequence in which the groups of battery cells are connected to the main motor.

The main motor MM is of a type suitable for propelling a truck or other vehicle, and is preferably of the series type having an armature 11 and a series field winding 12. The auxiliary motor AM is of a type suitable for operating auxiliary apparatus, such as a hydraulic pump for operating the lifting fork of a truck. The motor AM may be of the shunt type having an armature 13 and a shunt field winding 14.

As previously expained, the battery cells are divided into a plurality of groups with each group containing the same number of cells, for example, six. The switches or contactors A, B and C each have two sets of contact members, a normally open set designated A″, B″ and C″, respectively, and a normally closed set designated A′, B′ and C′, respectively.

The stepping switch SS may be of the cam type having a plurality of contact members which are actuated by cams driven by a cam shaft, or it may be of the drum type, as shown, having a plurality of contact fingers which engage segments on a rotatable drum. As shown, the operating mechanism for the switch SS comprises a coil 15 which actuates a core 16. The core 16 is attached to a ratchet mechanism 17 which, in turn, is attached to a spring 18. The ratchet mechanism drives the shaft 19. When the coil 15 is energized, the core 16 stretches the spring 18 to store energy in the spring. When the coil 15 is denergized, the spring 18 operates the ratchet mechanism 17 to drive the shaft 19 one notch or step.

The control switch CS is preferably of a type which may be manually or foot operated. When an operating head 21 is depressed, the contact members 6 and 7 are actuated in sequential relation so that the movable contact member 6 engages fixed contact members 8 prior to the engagement of the movable contact member 7 with fixed contact members 9.

The reversing switches F and R are preferably of the electromagnetic type, with each switch having two sets of normally open main contact members and one set of normally open auxiliary contact members. The energization of the actuating coils for the switches F and R is controlled by a manually operable switch 22.

It will be noted that the three groups of battery cells B1, B2 and B3 are normally connected across power conductors P and N so that these conductors are normally energized when the actuating coils of the switches A, B and C are deenergized. It will also be noted that a blocking diode 23 is provided between the positive terminal of each battery group and the positive conductor P. Likewise, blocking diodes 24 are provided in the circuits to the contact members of the switches 1, 2 and 3. These diodes prevent short-circuiting of the battery cells during the switching operations. The diodes may be of the semiconductor type having a low resistance to the flow of current in one direction and a high resistance to the flow of current in the opposite direction. A switch 25 is provided for connecting the auxiliary motor AM across the conductors P and N. Likewise, a manually operable switch 26 is provided for connecting the switches CS and SS across the conductors P and N. A battery charging receptacle BC is provided for charging the battery when the truck is not in operation and the switches A, B and C are deenergized.

Assuming that the switch 26 is closed, the main motor MM may be energized to operate the truck in the forward direction by operating the switch 22 to energize the actuating coil of the contactor F, thereby closing the contact members of the forward switch. A holding circuit for the coil of the switch F is provided through auxiliary contact members F' on the switch.

At this time, an energizing circuit for the coil 15 of the stepping switch SS is established through a diode 27. As previously explained, the energization of the coil 15 actuates the core 16 to store energy in the spring 18.

Also at this time, the actuating coil of the switch 1 is energized through contact members 31 of the switch SS, it being assumed that this switch is in the number one position or step. The actuating coils of the switches A, B, C, 2 and 3 are deenergized at this time. Thus, the contact members of the switch 1 are closed and the contact members of the switches 2 and 3 are open. The contact members A", B" and C" are open and the contact members A', B' and C' are closed.

When the switches A, B and C are deenergized, the three groups of battery cells are connected in series-circuit relation across the conductors P and N, thereby applying the full battery voltage of thirty-six volts to these conductors. Thus, full battery voltage is available for operating the auxiliary motor AM by closing the switch 25. Likewise, full battery voltage is available for operating the switches A, B, C, 1, 2 and 3.

The circuit for energizing the conductors P and N at this time may be traced from the conductor N through contact members C' of the switch C which is deenergized at this time, conductor 34, the battery group B1, conductor 35, contact members A', the battery group B2, conductor 36, the contact members B', the battery group B3 and a diode 23 to the conductor P.

The closing of the switch 1 connects the battery group B1 to the main motor MM, thereby applying twelve volts to the motor. The circuit through motor MM extends from the positive terminal of the group B1 through a diode 24, the contact members of the switch 1, conductor 37, the armature 11, contact members F1 of the reversing switch F, the field winding 12, contact members F2, the negative conductor N, the contact members C' and the conductor 34 to the negative terminal of the battery group B1.

When the control switch CS is depressed to engage the contact member 6 with the contact members 8, the switch 2 is closed. The circuit for the coil of the switch 2 extends through contact members 38 of the switch SS since this switch is still on the number one position.

The closing of the switch 2 connects the battery groups B1 and B2 to the motor MM in series-circuit relation, thereby increasing the voltage on the motor to 24 volts. The series connection between the groups B1 and B2 is established through contact members A' which are closed at this time.

When the switch CS is depressed further, the contact member 7 engages the contact member 9 to establish an energizing circuit for the coil of the switch 3 through contact members 39 of the switch SS. The closing of the switch 3 connects the three battery groups to the motor MM in series-circuit relation, thereby applying thirty-six volts to the motor. The series connection between group B2 and the group B3 is established through contact members B' which are closed at this time.

Power may be shut off from the main motor MM by actuating the switch 22 to its mid-position and returning the switch CS to its raised position. At this time, the coil 15 of the switch SS is deenergized, thereby permitting the energy in the spring 18 to operate the switch SS to position number two by means of the ratchet mechanism 17. When power is now reapplied to the motor, the grouping of the battery cells is rotated to connect a different group first to the motor when power is reapplied. In this manner, equalization of the discharging of the battery groups is obtained.

Assuming that it is desired to operate the vehicle in the reverse direction, the switch 22 is actuated to a position to energize the coil of the reverse contactor R. At this time, the coil 15 of the stepping switch SS is also energized through a diode 41.

Also at this time, the switch A is energized through the contact members 32 of the switch SS and the switch C is energized through contact members 42 of the switch SS. The switch B is not closed at this time. The switch 2 is closed at this time, the circuit for the coil of the switch 2 extending through contact members 43 of the switch SS. The closing of the switch 2 connects the battery group B2 to the main motor MM, through contact A", to apply twelve volts to the motor.

When the switch CS is then operated to engage the contact members 6 with the contact members 8, the coil of the switch 3 is energized through contact members 44 of the switch SS. The closing of the switch 3 connects the battery group B3 to the motor MM in series-circuit relation with the group B2, through contact B' and conductor 36, thereby applying twenty-four volts to the motor.

When the switch CS is depressed further to engage the contact member 7 with the contact members 9, the actuating coil of the switch 1 is energized through contact members 45 of the switch SS. The closing of the switch 1 adds the group B1 to the series-connected groups, through contact C", thereby applying thirty-six volts to the motor to complete the accelerating cycle.

It will be noted that with the controller SS in the number two position and switches A and C energized, all three battery groups are in series across the conductors P and N to supply full battery voltage to the auxiliary motor AM. This battery circuit extends from the conductor N through contact A", battery group B2, conductor 36, contact B', battery group B3, contact C", conductor 34 and battery group B1 to conductor P.

When power is cut off the motor by returning the member 22 of the reversing controller to its mid-position and returning the switch CS to its raised position, the coil 15 is deenergized and the stepping switch SS is actuated to position three, thereby rotating the sequence of operation of the battery grouping switches.

When power is reapplied to the main motor by operating the controller 22 to energize either the forward switch F or the reverse switch R, the switches B and C are closed and the switch A is open. Likewise, the switch 3 is closed and the switches 1 and 2 are open since the switch SS is now on step three. The circuits for the coils of switches B and C extend through contact members 33 and 42, respectively, of the switch SS. The circuit for the coil of switch 3 extends through contacts 47.

At this time, the three battery groups are again in series across the conductors P and N, the circuit extending from conductor N through contact B", battery group B3, contact C", conductor 34, battery group B1, conductor 35, contact A', and battery group B2 to conductor P. Thus, full battery voltage is available for the auxiliary motor AM.

At this time, the battery group B3 is connected to the main motor MM through a conductor 46, a diode 24 and the switch 3, and through contact B". The battery group B1 is connected to the motor in series-circuit relation with the group B3 by actuating the switch CS to close the switch 1. The battery group B2 is connected in series with the other groups by actuating the switch CS to close the switch 2. The circuits for the coils of switches 1 and 2 extend through contact members 48 and 49, respectively, of the switch SS. When power is shut off the motor the switch SS is actuated to position one, thereby completing the rotation of the battery groups.

The battery may be charged whenever the truck is out of operation and the switch 26 is open. When the switch 26 is open the switches A, B, C, 1, 2 and 3 are deenergized regardless of the position of the switch SS. When the switches A, B and C are deenergized, the battery sections or groups B1, B2 and B3 are connected across the charging receptacle BC in series-circuit relation. Thus, the battery may be charged by connecting the receptacle BC to a suitable course of direct current potential. The battery charging circuit extends from the positive terminal of the receptacle BC through conductor 46, the battery group B3, contact members B', conductor 36, the battery group B2, contact members A', conductor 35, the battery group B1, conductor 34 and contact members C' to the negative conductor N which is connected to the negative terminal of the receptacle BC.

From the foregoing description, it is apparent that the main motor is accelerated by connecting the battery groups to the motor in sequential relation to increase the voltage on the motor in successive steps. The full battery voltage is available at all times for operating auxiliary equipment. The grouping of the battery cells is so rotated that a different group is first connected to the motor each time power is applied to the motor. In this manner, equalization of the discharging of the battery cells is obtained. The diodes in the battery circuits prevent short-circuiting of the battery cells during the switching operations. Provision is made for charging the battery whenever the truck is out of service. The control system is relatively simple and is particularly suitable for controlling the operation of battery-powered trucks or other vehicles.

Since numerous changes may be made in the above-described construction, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In combination, a motor, a battery having a plurality of cells for supplying power to the motor, said cells being divided into at least three groups, first switching means for sequentially connecting groups of cells to the motor, second switching means for establishing connections between the groups of cells, said first and second switching means cooperating to initially connect one group of cells to the motor and to thereafter sequentially connect additional groups in series to increase the voltage applied to the motor, control means for effecting operation of said first and second switching means, said control means including a control device having a plurality of positions at least equal in number to the number of groups of cells, said control device being adapted in its different positions to change the sequential operation of the first switching means and to effect operation of the second switching means to change the sequential order of connection of the groups of cells, and means for effecting actuation of the control device from one position to another each time the control means is operated to start the motor and to thereafter stop the motor.

2. In combination, a motor, a battery having a plurality of cells for supplying power to the motor, said cells being divided into at least three groups, first switching means comprising a plurality of switches for connecting said groups of cells to the motor, second switching means comprising a plurality of switches for establishing connections between the groups of cells, control means for effecting sequential operation of the switches of the first switching means to initially connect one group of cells to the motor and to thereafter sequentially connect additional groups of cells in series to increase the voltage applied to the motor, said control means including a control device having a plurality of positions at least equal in number to the number of groups of cells, said control device being adapted in its different positions to change the sequential order of operation of the switches of the first switching means and to effect actuation of the switches of the second switching means to change the sequential order of connection of the groups of cells, and means for effecting actuation of the control device from one position to another each time the control means is operated to start the motor and to thereafter stop the motor.

3. In combination, a main motor, an auxiliary motor, a battery having a plurality of cells for supplying power to said motors, said cells being divided into at least three groups, first switching means for sequentially connecting groups of cells to the main motor, second switching means for establishing connections between the groups of cells, said first and second switching means cooperating to initially connect one group of cells to the main motor and to thereafter sequentially connect additional groups in series to increase the voltage applied to the main motor, said second switching means also connecting all of the groups of cells in series for connection to the auxiliary motor, control means for effecting operation of said first and second switching means, said control means including a control device having a plurality of positions at least equal in number to the number of groups of cells, said control device being adapted in its different positions to change the sequential operation of the first switching means and to effect operation of the second switching means to change the sequential order of connection of the groups of cells, the second switching means connecting all groups of cells in series for connection to the auxiliary motor in all positions of the control device, and means for effecting actuation of the control device from one position to another each time the control means is operated to start the motor and to thereafter stop the motor.

4. In combination, a main motor, an auxiliary motor, a battery having a plurality of cells for supplying power to said motors, said cells being divided into at least three groups, first switching means comprising a plurality of switches for connecting said groups of cells to the main motor, second switching means comprising a plurality of switches for establishing connections between the groups of cells, said second switching means connecting all of the groups in series for connection to the auxiliary motor, control means for effecting sequential operation of the switches of the first switching means to initially connect one group of cells to the motor and to thereafter sequentially connect additional groups of cells in series to increase the voltage applied to the motor, said control means including a control device having a plurality of positions at least equal in number to the number of groups of cells, said control device being adapted in its different positions to change the sequential order of operation of the switches of the first switching means and to effect actuation of the switches of the second switching means to change the sequential order of connection of the groups of cells, the second switching means also connecting all groups of cells in series for connection to the auxiliary motor in all positions of the control device, and means for effecting actuation of the control device from one position to another each time the control means is operated to start the motor and to thereafter stop the motor.

References Cited by the Examiner

UNITED STATES PATENTS

| 652,124 | 6/1900 | Leitner | 318—83 |
| 1,776,317 | 9/1930 | Huguenin | 320—16 X |
| 3,168,688 | 2/1965 | Roggenkamp | 318—17 |

FOREIGN PATENTS 1,197,508  12/1959  France.

ORIS L. RADER, *Primary Examiner.*

T. LYNCH, *Assistant Examiner.*